Sept. 11, 1934.  A. E. SPINASSE  1,973,546
MEANS FOR AND METHOD OF SEPARATING GLASS SHEETS
Filed Nov. 4, 1926
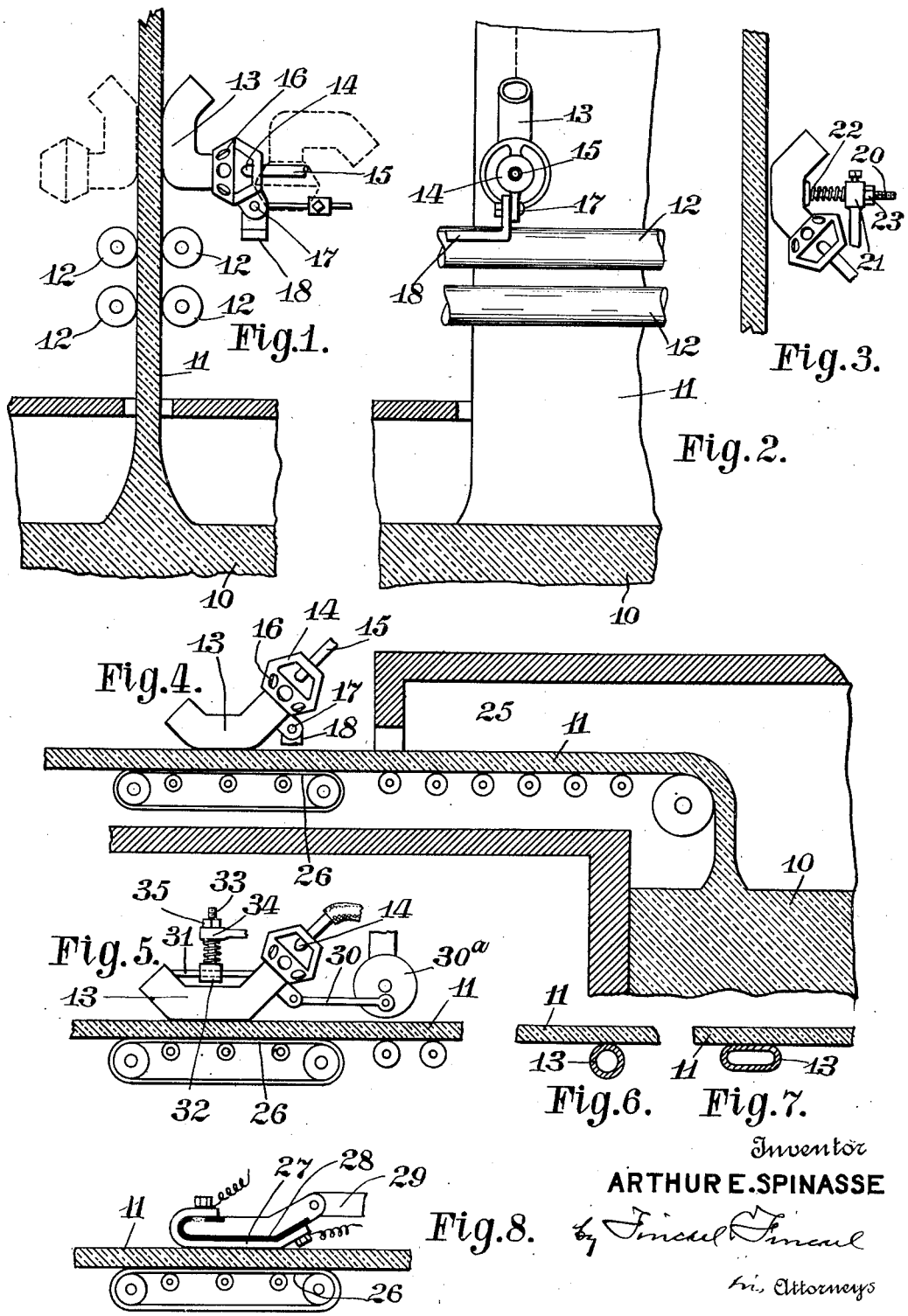

Patented Sept. 11, 1934

1,973,546

UNITED STATES PATENT OFFICE 1,973,546

MEANS FOR AND METHOD OF SEPARATING GLASS SHEETS

Arthur E. Spinasse, Mount Vernon, Ohio

Application November 4, 1926, Serial No. 146,247

24 Claims. (Cl. 49—50)

The border portions of a drawn sheet of glass are more or less brittle, or they lack the quality of the intermediate portion of the sheet, hence in practice the border portions are commonly removed for the purpose of producing a sheet and panes or lights of glass of substantially uniform texture or quality.

The object of my invention is to provide means for and a method of distinctly or additionally heating or annealing the borders of the sheet as it is drawn from the bath so that such border strips can be removed without impairing the integrity or fracturing the retained body of the sheet. Other objects of the invention will appear from the disclosure herein.

The invention is embodied in the examples and method herein shown and described the features of novelty being finally claimed.

In the accompanying drawing—

Fig. 1 is an elevation with parts in section looking toward the edge of a drawn sheet of glass with one form of my invention embodied therewith.

Fig. 2 is an elevation of the same with parts in section looking toward the left at Fig. 1.

Fig. 3 is a modification of the heating device.

Fig. 4 is an elevation with parts in section looking at the edge of a horizontally moving drawn sheet of glass with my invention applied thereto.

Fig. 5 is a detail showing in side view a means for reciprocating the heating device.

Figures 6 and 7 show cross sections of two forms of heating elements in contact with the border portion of the sheet.

Fig. 8 illustrates a modification in which an electric heating element is employed.

In the views, and referring first to Figs. 1 and 2, the character 10 designates the drawing bath of molten glass from which the sheet 11 is being drawn between the usual drawing rolls 12. The character 13 designates the body of the heating member which in the instance referred to includes a tubular portion of metal or other suitable refractory material adapted to present a heating surface in close contact with or in close proximity to the body of the drawn sheet near the region where the same is to be cut to remove the border. The said tubular portion is supplied with heat by means of an ordinary gas burner 14 fed with gas through a pipe 15, the usual perforated regulating air valve 16 being present to promote combustion of the gas. This heating element is pivotally mounted at 17 on any fixed portion 18 so that the elements can be swung into or out of operating position as indicated by full and broken lines respectively in Fig. 1. The said heating element can be provided with an arm affixed thereto having an adjustable counter weight thereon to regulate the pressure exerted by the heating element on the glass. The pipe of the heating element described can be of any desired length so as to present to the glass lengthwise of the border portion a heating surface or line of much or little extent according to the thickness of the glass treated. It will be obvious, therefore, that as the sheet of glass is drawn past the heating element the border of the glass is heated in a path parallel to and near the edge of the sheet so that if the glass be cut or checked by means of a cold checking tool beyond the heater along the heated path, shown by the broken line in Figure 2, the border can be easily removed without fracturing the body of the sheet. Ordinarily the crack thus made will automatically continue to progress in the glass to the heater as the glass is drawn past the latter. It will be clear that the heater when in operative position will maintain the longitudinally extending crack in the sheet of glass being drawn adjacent to said heating member, and also what is of importance it will prevent said crack from progressing beyond said heating member toward the source of the drawn sheet. The temperature of the heating element can be varied according to the thickness of the glass or the speed at which it is drawn past the heater but as a rule a cherry-red heat yields good results for the average sheet at the average speed of drawing.

Referring to Fig. 3, the heating element is shown as not contacting with the glass but as spaced slightly therefrom, thus avoiding wear of the heater due to friction of the glass. In this instance means are shown for varying the distance the heating element shall occupy in relation to the surface of the glass, said means including a threaded stem 20 sliding in a fixed sleeve 21 with a spring 22 between the sleeve and the heater so that, by adjusting a nut 23 on said threaded stem, the heating element can have its position changed, the spring holding the heating element in the position to which changed or adjusted. In this construction the heater can, of course, be adjusted to contact with the glass in which case the friction can be regulated to the desired amount. It is obvious that the heater can have a fixed and unyielding position if desired.

Referring to Figs. 4 and 5 the glass sheet is shown as drawn vertically from the molten bath and thence horizontally through a leer 25. The heating element such as shown in Figs. 1 and 2 is also shown as applied to the horizontally moving sheet but above a belt of support 26 for the sheet the operation and effect in this instance being substantially the same as described with reference to Figs. 1 and 2. In Fig. 5 the heating element is shown as provided with a pitman 30 whereby it can be reciprocated longitudinally by means of a driven wheel 30ᵃ, with respect to the glass sheet for the purpose of increasing the frictional contact and thus eliminating cross checking of the glass at the line of severance. The heating member in Fig. 5 is shown as provided with a guiding rod 31 sliding in a sleeve 32 on a spring held stem 33 sliding in a fixed holder 34. The pressure of the heating element can be regulated by a nut 35 on the upper end of said stem.

In Fig. 6 the heated tube is shown as circular in cross section so that the contact will be substantially a line. In Fig. 7 the heated tube is shown as flattened so as to present a broadened heating surface.

In Fig. 8 is shown the heated element as being electrically heated by means of a resisting electric conductor 27 suitably mounted on an insulating body 28 or body with insulating means, said body being pivoted upon a fixed support 29 in substantially the manner described with reference to the other instances. Such electrically energized heating element can, of course, be used with a vertically drawn sheet of glass as shown in Figs. 1 and 2.

It will be understood that my invention can be used for treating both border portions of the drawn sheet. It may be stated at this point, also that the heating element should be applied at that point of the glass sheet where the glass has become set.

Where the glass is thick a heating element can be used on opposite sides of the same body portion as suggested by the broken lines in Fig. 1.

The sheet being drawn may reach 50 inches to 100 inches in width. The heating devices may also be used for independently annealing the border portions of the drawn sheet and the width of said device may be increased to cover the entire border portion of the drawn sheet including the edges in close spaced relation or in contact therewith. Said devices may also be placed above one another in any numbers in desired positions along the border portions of the sheet between the drawing zone and the cutting zone of the sheet.

Their forms, numbers and positions may be varied for both cutting and annealing. For instance, a relatively narrow heated device, about one half of an inch in width, may be used at the cutting zone and in advance of this the heater or heaters used may vary from say two to ten inches in width for greater annealing of the border portion of the sheet. At times similar devices may also be used at the extreme side edges of the sheet.

The forms of the parts can be changed without departing from the gist of the invention as claimed.

What I claim is:

1. Means for promoting the removal of a border portion of a drawn sheet of glass consisting of a heating element located to continuously apply heat to the glass sheet as it travels from the drawing bath and along the line at which it is desired to sever the glass border.

2. The art of removing a border portion from a sheet of drawn glass consisting in continuously applying heat longitudinally along such border portion and causing a crack in said sheet to automatically follow said application of heat.

3. Means for promoting the removal of a border portion of a drawn sheet of glass consisting of a heating element fixed with reference to the moving sheet of glass and positioned to apply heat to the set glass as it travels past the fixed heating element and along the line at which it is desired to sever the glass border, and means for vibrating said heating element within the confines of its relatively fixed position.

4. The art of removing a border portion from a sheet of drawn glass consisting in applying heat to the set glass at a point fixed with reference to the moving sheet and along a line at which it is desired to sever the glass border, and starting a crack at a point in the heated line of glass which will run to the heating point and automatically sever the subsequently drawn border portion.

5. The art of removing a border portion from a sheet of drawn glass consisting in continuously applying heat along such border portion upon the opposite faces thereof and causing a crack in said sheet to automatically follow said application of heat.

6. In the manufacture of flat sheet glass, the process which consists in first producing a continually formed glass ribbon from molten glass, allowing the formed glass ribbon to set, heating the set glass ribbon at a predetermined distance from the edge of the ribbon and along a line longitudinally with the ribbon by mechanical means and while the sheet is actually being formed, and then severing the glass along said heated line.

7. A process consisting in continuously forming a sheet of glass upwardly from molten glass applying metallic elements heated cherry red against the glass along predetermined lines longitudinally with the plane of the sheet while maintaining said elements substantially stationary to create a frictional sliding action at the point of contact of the sheet upon said elements as the moving sheet passes said heating elements, and then causing the glass to separate along said heated lines.

8. An apparatus for severing longitudinal portions from a continuously formed sheet of glass, comprising a pair of heating members extending longitudinally of the plane of the sheet, one at each opposite face of the sheet disposed for continually heating the sheet along lines longitudinally with the sheet at which it is desired to sever the sheet, fixed support means for said heating members, said heating members being pivoted to said support means for swinging said heating members into and out of heating contact with the plane surfaces of the sheet at predetermined corresponding distances from the edge of the sheet.

9. An apparatus for severing portions of an upwardly moving sheet of glass, comprising a heating element in constant contact with the surface of the sheet and extending upwardly longitudinally of the sheet at a predetermined distance from the edge thereof, a fixed support member, a secondary support means for said element, said secondary support means being freely pivoted to said fixed support member whereby the heating element may adjust itself to the surface of the sheet, and means for heating said element.

10. An apparatus for severing portions from a continuously formed sheet of glass, comprising a fixed supporting member, a heating element pivotally connected to said support member and extending longitudinally of the plane of the sheet and contacting therewith at a predetermined distance from the edge of the sheet, and means for counterbalancing said heating element to regulate the pressure thereof upon the sheet.

11. An apparatus for severing portions from a flat sheet of glass, comprising a long narrow heating member disposed for continually heating the sheet along predetermined lines, a fixed support member, said heating member having one end free and one end only thereof pivotally connected to said support member for swinging said heating member into or out of heating contact with the surface of the sheet.

12. The art of removing glass sections from a moving sheet of glass continuously formed from molten glass which consists in continually heating the moving sheet along predetermined lines by contact of the sheet with mechanical heating means and thereby automatically effecting the separation of said sections from the moving sheet along said heated lines.

13. A device for cracking-off sections of glass comprising a member for heating the glass and mechanically operated means for reciprocating said cracking-off member when in contact with the glass.

14. An apparatus for severing portions from a moving sheet of glass, comprising an electric heating element contacting with the surface of the sheet and extending longitudinally of the moving sheet, a fixed support member, a support means for said element, said support means being pivoted to said fixed support member for swinging said supported element into and out of heating contact with the sheet, and means for passing a heating current of electricity through said element.

15. An apparatus for separating border portions from an upwardly moving sheet of glass, comprising a heating element disposed longitudinally of the moving sheet in heating contact therewith, means for supporting said heating element whereby said heating element will freely adjust itself upon the surface of the sheet, and means for heating said element.

16. Apparatus for separating the edge of an upwardly moving sheet of glass, comprising a heating element extending longitudinally of the sheet adjacent the edge thereof, a fixed supporting member, a second supporting member pivoted on said fixed member and carrying said heating element so that the element is free to adjust itself to the position of the sheet, and a gas burner for heating said element.

17. An apparatus for separating sections from a sheet of glass, comprising means for supporting and moving the sheet, a fixed member, an upright heating element pivoted to said member and adapted to automatically heat the moving sheet along a predetermined line, and means for heating said element.

18. Apparatus for separating the edge of an upwardly moving sheet of glass, comprising a heating element extending longitudinally of the sheet adjacent the edge thereof, a fixed supporting member, a second supporting member pivoted on said fixed member and carrying said heating element so that the element is free to adjust itself to the position of the sheet, and means for causing a flow of electric current through said element to heat it.

19. Apparatus for separating the edge of an upwardly moving sheet of glass, comprising a fixed supporting member, an arm extending transversely of the plane of the sheet pivoted to said member, an upright heating element carried by said arm and adapted to engage the sheet adjacent its edge, and means for causing a flow of current through said element to heat it.

20. A device for cracking flat glass in a rectilinear line consisting of a tubular metallic member having a rectilinear heating line for application to the glass to be cracked, and means for supplying heat to the interior of said tubular member.

21. Means for cracking a sheet of glass including a support to receive the sheet of glass, a second support adjacent thereto, a glass cracking member mounted on said second support, said glass cracking member movable on its support into a substantially fixed position on the sheet of glass, and means for heating said cracking member.

22. Means for cracking a sheet of glass including a support to receive the sheet of glass, a second support adjacent thereto, a glass cracking member mounted on said second support, said glass cracking member movable on its support into a substantially fixed position on the sheet of glass, means for regulating the pressure of said cracking member on the sheet of glass, and means for heating said cracking member.

23. Means for cracking a sheet of glass including a support to receive the sheet of glass, a second support adjacent thereto, a pair of cooperating glass cracking members, one for each side of the glass sheet, one of said glass cracking members movable on its support into a substantially fixed position on the sheet of glass, and means for heating said last named cracking member.

24. Apparatus for separating the edge of an upwardly moving sheet of glass, comprising a fixed supporting member, a counterbalanced arm extending transversely of the plane of the sheet pivoted to said member, an upright heating element carried by said arm and adapted to engage the sheet adjacent its edge, and means for causing a flow of current through said element to heat it.

ARTHUR E. SPINASSE.